(12) United States Patent
Christie (10) Patent No.: US 8,576,662 B2
(45) Date of Patent: Nov. 5, 2013

(54) INTERPOLATION AND/OR EXTRAPOLATION OF SEISMIC DATA

(75) Inventor: Philip Christie, Fen Drayton (GB)

(73) Assignee: WesternGeco L.L.C., Houston, TX (US)

( * ) Notice: Subject to any disclaimer, the term of this patent is extended or adjusted under 35 U.S.C. 154(b) by 222 days.

(21) Appl. No.: 12/823,335

(22) Filed: Jun. 25, 2010

(65) Prior Publication Data
US 2010/0329078 A1 Dec. 30, 2010

(30) Foreign Application Priority Data
Jun. 29, 2009 (GB) .................................. 0911148.5

(51) Int. Cl.
*G01V 1/00* (2006.01)
(52) U.S. Cl.
USPC ............................................. 367/38; 382/109
(58) Field of Classification Search
USPC ............................................. 382/109; 367/38
See application file for complete search history.

(56) References Cited

U.S. PATENT DOCUMENTS

| | | | |
|---|---|---|---|
| 4,476,553 A | | 10/1984 | Ziolkowski et al. |
| 4,803,668 A | * | 2/1989 | Berryhill et al. ................. 367/72 |
| 5,339,282 A | | 8/1994 | Kuhn et al. |
| 6,292,755 B2 | | 9/2001 | Chambers |
| 6,480,440 B2 | | 11/2002 | Douma et al. |
| 6,646,593 B1 | | 11/2003 | Garren |
| 6,898,148 B2 | | 5/2005 | MacKay |
| 7,095,678 B2 | * | 8/2006 | Winbow et al. ................. 367/73 |
| 7,782,708 B2 | * | 8/2010 | Christie et al. ................. 367/21 |
| 2007/0213935 A1 | | 9/2007 | Fagnou et al. |
| 2009/0245023 A1 | * | 10/2009 | Lie ................................. 367/50 |
| 2010/0220895 A1 | * | 9/2010 | Koren et al. .................. 382/109 |

FOREIGN PATENT DOCUMENTS

| | | |
|---|---|---|
| EP | 0066423 B1 | 1/1988 |
| GB | 2376528 B | 3/2004 |
| GB | 2394050 A * | 4/2004 |
| GB | 2410551 B | 6/2006 |
| GB | 2414299 B | 8/2006 |
| GB | 2454747 A | 5/2009 |
| WO | 2005114258 A1 | 12/2005 |
| WO | 2008005775 A2 | 1/2008 |
| WO | 2008008632 A2 | 1/2008 |

OTHER PUBLICATIONS

Kraaijpoel: "Seismic ray fields and ray field maps: theory and algorithms", PhD thesis, Utrecht University, The Netherlands, 2003.
Ziolkowski et al: "The signature of an air gun array: Computation from near-field measurements including interactions", Geophysics, vol. 47, No. 10, 1982, pp. 1413-1421.

* cited by examiner

*Primary Examiner* — Mark Hellner (57) ABSTRACT

A method of processing seismic data is provided in the seismic data is acquired at a plurality of locations and the method comprises interpolating and/or extrapolating the seismic data, thereby to estimate seismic data at a target location different from the plurality of locations. The interpolating and/or extrapolating the seismic data is performed in a polar co-ordinate system. The method may provide for, among other things, accuracy of estimation; particularly at short offsets from the seismic source. The polar co-ordinate system used may be chosen to approximate the seismic wavefront in an earth model, for example in an earth model in which properties vary only with depth.

18 Claims, 6 Drawing Sheets

INTERPOLATION AND/OR EXTRAPOLATION OF SEISMIC DATA

BACKGROUND

Embodiments of the present invention relate to interpolation and/or extrapolation of seismic data, for example marine seismic data.

As generally used in the art, and as used herein, interpolation relates to constructing one or more new data points within the range of a discrete set of known data points, whereas extrapolation relates to constructing one or more new data points outside the range of a discrete set of known data points.

Seismic exploration is widely used to survey the earth's interior, for example to locate and/or characterise hydrocarbon deposits. In simple terms, a seismic survey is carried out by causing one or more sources to emit seismic energy into the earth's interior. The seismic energy propagates downwardly into the earth, and is reflected by geological formations within the earth. The reflected seismic energy is detected by one or more detectors (generally known as "receivers"), and information about the structure of the earth's interior can be obtained from the seismic energy reflected to the receivers.

A seismic survey may be conducted on land, in water, or in a land-water transition zone. A seismic survey conducted in water is normally known as a "marine seismic survey", although it should be understood that this term is not limited to a seismic survey carried out at sea (in salt water) but also covers surveys performed in fresh or brackish water.

Figure 1A:
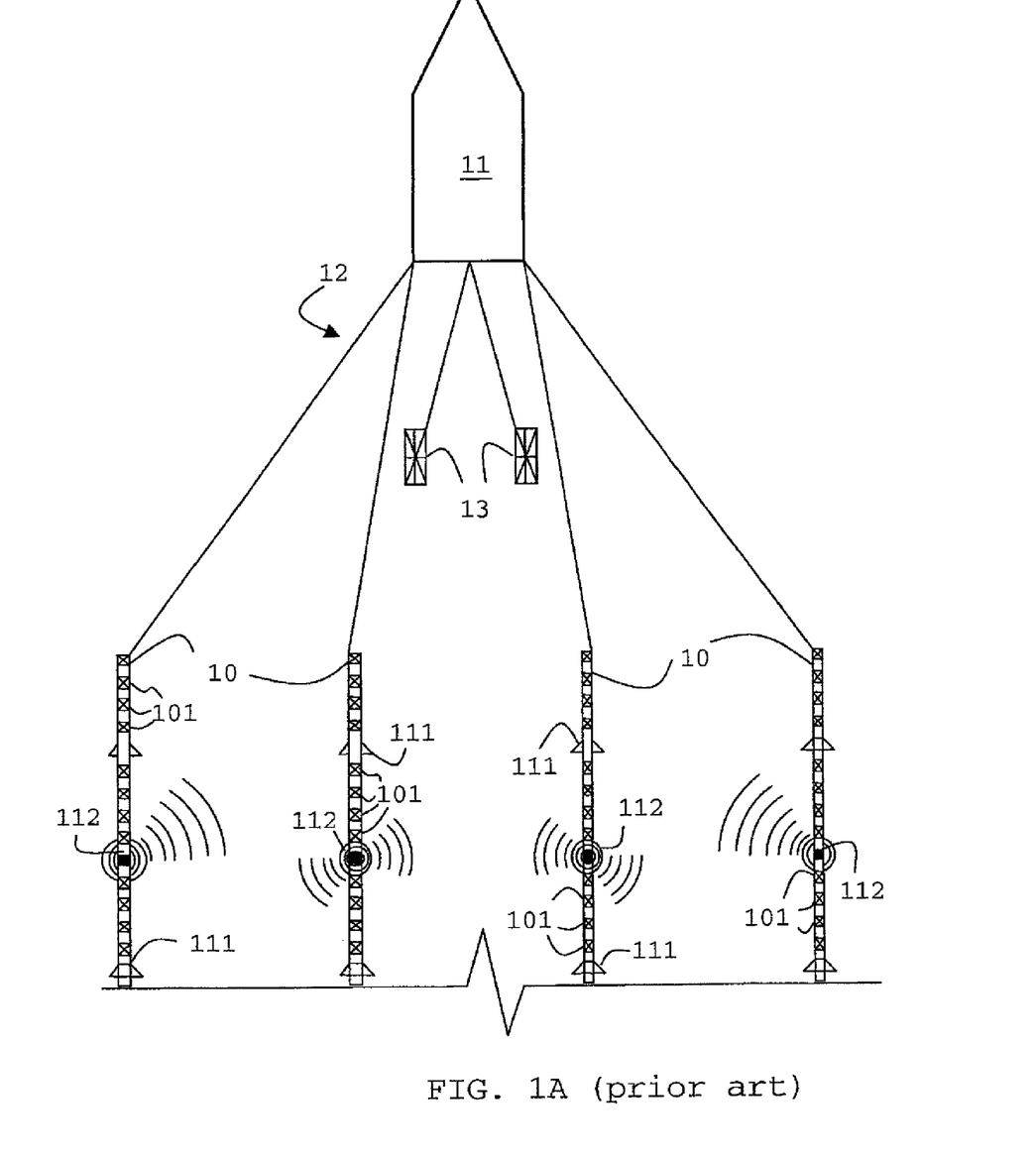
FIG. 1(a) is a schematic plan view of a seismic surveying arrangement.
Figure 1B:
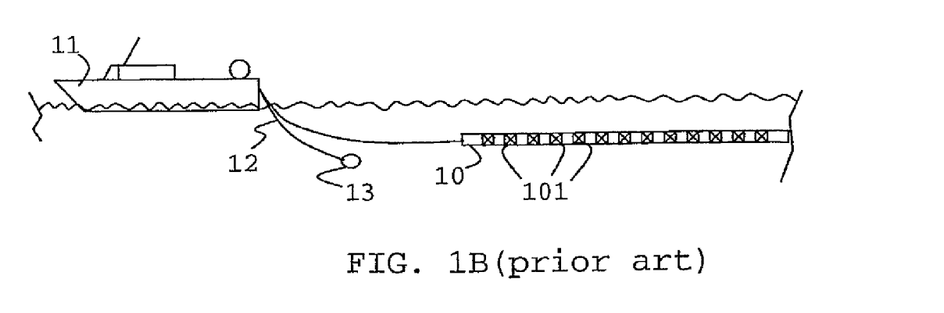
FIG. 1(b) is a schematic sectional view of the seismic surveying arrangement of FIG. 1(a).

FIG. 1(a) is a plan view and FIG. 1(b) is a side view of one form of a typical marine seismic survey, known as a towed marine seismic survey. Two alternately firing seismic sources 13, each comprising one or more seismic source elements, such as airguns, are towed by a survey vessel 11. Seismic receivers 101 are mounted on one or more receiver cables 10 (four cables are shown in FIG. 1(a), as an example), which are also towed through the water. FIGS. 1(a) and 1(b) show the receiver cables 10 as towed by the same survey vessel 11 as the sources 13, but in principle a second survey vessel could be used to tow the receiver cables 10. The receiver cables are often known as "seismic streamers". A streamer may have a length of up to 12 km or greater, with receivers 101 being disposed every few metres along a streamer. A typical lateral separation (or "cross-line" separation) between two streamers in a typical towed marine seismic survey is of the order of 100 m but can often range from 25 m to 120 m. The area within which receivers are provided is known as the "acquisition aperture" of the survey.

Typically streamers are provided with one or more positioning systems for providing information about both the absolute and relative positions, of the streamers 10. For example, the streamers may be provided with sonic transceivers 112 for transmitting and receiving sonic or acoustic signals for monitoring the relative positions of streamers and sections of streamers. The streamers may alternatively or additionally be provided with a satellite-based positioning system, such as GPS, for monitoring the positions of the streamers—for example, GPS receivers (not shown) may be placed at the front and rear of each of the streamers. Similarly, GPS receivers and other positioning sensors are used to locate the source 13 relative to the streamers and in a suitable geodetic coordinate frame. Vertical and/or lateral adjustments to the streamer positions may be effected by steerable wings, or "birds" (111) located at intervals along the streamer and integrated with the positioning system through a suitable controller.

When a source, 13, is actuated, it emits seismic energy into the water, and this propagates downwards into the earth's interior until it undergoes reflection by some geological feature within the earth. The reflected seismic energy is detected by one or more of the receivers 101.

In a marine seismic survey, the receivers 101 typically comprise hydrophones and/or geophones. A hydrophone measures pressure (a scalar quantity), whereas a geophone measures particle velocity or acceleration (a vector quantity). A one-component (1-C) geophone measures particle velocity or acceleration along one direction, whereas a three-component (3-C) geophone measures particle velocity or acceleration along each of three mutually orthogonal directions. Today, modern marine seismic survey streamers may contain both hydrophones and 1-C, 2-C or 3-C geophones. Other geophone geometries may also be considered which span the three Cartesian dimensions with a minimum of three sensors and where four or more sensors provide redundancy and quality-control information.

Another type of marine seismic survey is a seabed seismic survey, in which the receiver cables, comprising both hydrophones and multi-component geophones, are disposed on the seabed rather than towed through the water.

In the survey of FIG. 1, the seismic source is typically actuated at regular distance intervals, and each actuation is known as a "shot". When the source is actuated, the pressure is measured at each location where a hydrophone is provided on a streamer, and the particle velocity or acceleration (or a component thereof) is measured at each location where a geophone is provided on a streamer. This is repeated for each shot. It can therefore be seen that, for each shot, the pressure and/or particle velocity or acceleration is measured only at certain discrete locations within the acquisition aperture, corresponding to the positions of the hydrophones and geophones. Moreover, owing to the movement of the streamers through the water (which may be intentional owing to movement of the towing vessel 1 or the steerable birds 111, or may be unintentional owing to the action of wind, tides or currents), the positions at which the pressure and/or particle velocity or acceleration is measured for one shot will be different from the positions at which the pressure and/or particle velocity or acceleration is measured for another shot.

When acquired seismic data are processed it can often be desirable to know the pressure and/or particle velocity or acceleration at locations that are different from the positions at which the pressure and/or particle velocity or acceleration were measured. These locations may be inside the acquisition aperture of the receiver array, or they may be outside it. This is done by interpolating or extrapolating using the values of pressure or particle velocity/acceleration measured at the receiver positions to obtain estimates of the pressure or particle velocity/acceleration at locations different from the receiver positions. As one example, in a "time-lapse" seismic survey a survey is carried out at the same survey area at different times, for example to monitor a reservoir under production. Ideally each subsequent survey would be carried out with sources and receivers at the same positions as the earlier surveys, but this is very difficult to achieve with a towed marine survey. Notwithstanding the use of equipment, such as steerable birds 111, which allow a certain amount of control in the streamer positions to correct for cross-line drift of the streamers, surface currents can sometimes be too strong to allow a full correction to be made during data acquisition, so that the receiver positions in a subsequent survey do not exactly replicate the receiver positions in the initial survey. It is therefore usual to interpolate the pressure and/or particle velocity data recorded from each time-lapse survey onto a common acquisition grid, to allow the sets of data to be processed to give a time-lapse difference signal representative of changes in the reservoir.

The need to interpolate or extrapolate acquired seismic data is not limited to time-lapse seismic surveying, and there are many cases in which it is desired to interpolate or extrapolate acquired seismic data into regions where no receivers were present such as, for example, between adjacent receiver cables in the survey of FIG. 1. As a further example it may be desired to extrapolate the data to positions outside the acquisition aperture for the purpose of estimating data at very short offsets from the seismic source, which has application for attenuating multiples in the acquired data.

Various techniques for interpolating and extrapolating seismic data have been proposed. As an example, UK patent publication GB 2 414 299 discloses a technique for using measurements of pressure and gradients of pressure, or their equivalents such as components of particle velocity or acceleration, to interpolate the pressure field onto locations where no pressure measurements were actually made. The method of GB 2 414 299 uses a modified Taylor expansion to extrapolate the pressure field away from the two (or more) points and achieves the result through linear, Hermite or barycentric weighting, according to the application. The Taylor expansion is modified for interpolation according to a proposal from Kraaijpoel (Kraaijpoel, D., Seismic ray fields and ray field maps: theory and algorithms. PhD thesis, Utrecht University 2003) who defines weights which achieve an accuracy equivalent to one order higher than the order of the Taylor expansion.

SUMMARY

A first aspect of the present invention provides a method of processing seismic data acquired at a plurality of locations, the method comprising interpolating and/or extrapolating the seismic data, thereby to estimate seismic data at a target location different from the plurality of locations; wherein the interpolating and/or extrapolating the seismic data is performed in a polar co-ordinate system.

Embodiments of the present invention may provide, among other things, for extending the concept described in GB 2 414 299, the content of which is hereby incorporated by reference for all purposes, by teaching the use of interpolation and/or extrapolation in a polar coordinate system, for accurately computing wavefields at locations where such wavefields were not recorded. Use of a polar coordinate system gives increased accuracy in interpolation and extrapolation, particularly at short offsets. Use of a polar coordinate system provides greater accuracy because the relative positions of the source and all receivers used in acquisition of the seismic data are known and are hence available for use in the interpolation/extrapolation, and because interpolation/extrapolation in polar coordinates relies less upon the gradient by using prior knowledge of the anticipated symmetry of the wavefield, in which hemispherical wavefronts from an approximately isotropic, marine point source interact with a largely horizontally-layered earth so that wavefronts reaching the horizontal plane of the receivers from an isotropic source are circular about the source point, resulting in approximately circular, back-scattered wavefronts within and beyond the acquisition aperture. This means that the pressure varies slowly with azimuth and it is possible to interpolate/extrapolate with greater accuracy because ideally the azimuthal gradient is zero. When the invention is applied to extrapolation, it is possible to extrapolate farther, with greater accuracy, than is possible with a Cartesian co-ordinate system, especially near to the source. Indeed it has been found that zeroth order polar interpolation may perform better than Cartesian first order interpolation, Even though the real earth is not flat-layered, the use of a polar interpolation is a more neutral assumption than a Cartesian interpolation, especially in combating aliasing in the poorly-sampled cross-line direction at locations having short offsets from the source.

Such polar interpolation may also benefit an acquisition system in which the noise associated with the gradient measurement derived from particle velocity or acceleration may be greater than that associated with the pressure measurement.

The polar co-ordinate system used may be chosen to approximate the seismic wavefront in an earth model. As mentioned above, this uses prior knowledge of the anticipated symmetry of the wavefield to provide increased accuracy in interpolation and extrapolation.

The polar co-ordinate system used may be chosen to approximate the seismic wavefront in an earth model in which properties vary only with depth.

The interpolating and/or extrapolating of the seismic data may be performed in a 2-D polar coordinate system. (Embodiments of the present invention are not however limited to this, and may alternatively be applied using a 3-dimensional polar coordinate system.)

The interpolating and/or extrapolating of the seismic data may be performed using an expansion series defined in a polar coordinate system, for example a Taylor expansion series. It may be performed using a modified Taylor expansion series of the type proposed in GB 2 414 299, but defined in a polar coordinate system rather than in Cartesian coordinates.

Embodiments of the present invention may be applied to interpolation/extrapolation of multi-component seismic data. This has the advantage that it may be possible to estimate a spatial derivative of a first component of the seismic data using a second component of the seismic data. As an example, the spatial derivatives of pressure in the x- and y-directions may be found from the time derivatives of the x- and y-components of particle velocity, V:

$$\frac{\partial P}{\partial x} = \rho \frac{\partial V_x}{\partial t} \text{ and } \frac{\partial P}{\partial y} = \rho \frac{\partial V_y}{\partial t}, \quad (1)$$

where $\rho$ is the local density of water. This may be of particular advantage in a case when the seismic data were acquired using receivers disposed on seismic cables, as it can be used to obtain derivatives in a direction perpendicular to the cables.

Other aspects of the invention provide a corresponding apparatus and computer-readable medium.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention, it being understood that various changes may be made in the function and arrangement of elements without departing from the scope of the invention as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As mentioned above, GB 2 414 299 proposes interpolating/extrapolating seismic data using a Taylor expansion to extrapolate the pressure field away from the two (or more) points. A Taylor expansion has the general form (in two dimensions) of:

$$P(x+\Delta x, y+\Delta y) = P(x,y) + \left[\Delta x \frac{\partial P}{\partial x} + \Delta y \frac{\partial P}{\partial y}\right] + \qquad (2)$$
$$\frac{1}{2!}\left[(\Delta x^2)\frac{\partial^2 P}{\partial x^2} + 2\Delta x \Delta y \frac{\partial^2 P}{\partial x \partial y} + (\Delta y^2)\frac{\partial^2 P}{\partial y^2}\right] + O(\Delta^3)$$

In equation (2), the operator $\partial$ a denotes a spatial partial derivative, and the term $O(\Delta^3)$ indicates the order of the lowest-order term neglected in the expansion (so in equation (2) the third order term is the lowest-order term neglected).

GB 2 414 299 proposes a "modified" Taylor expansion. While use of the modified Taylor expansion of GB 2 414 299 can obtain good results in many cases, GB 2 414 299 shows plots of interpolation residuals which show an increase in residual error with decreasing offset (where the "offset" is the horizontal distance between the source and the receiver), for all orders of interpolation. The inventor has realised that this error is due to the adoption of a Cartesian coordinate system in GB 2 414 299 for interpolating a spreading wavefield that has approximately spherical symmetry. At short offsets, the rate of change of the wavefield in the cross-line direction between two streamers 100 m apart (which is a typical streamer separation) is too great to be successfully interpolated even with cross-line gradients.

Figure 2:
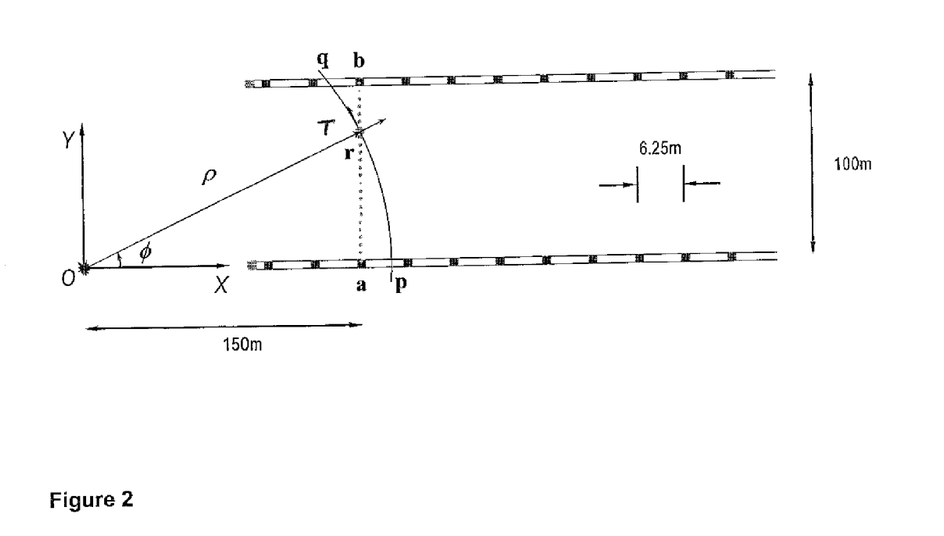
FIG. 2 is a schematic plan view of a seismic surveying arrangement in accordance with an embodiment of the present invention.

Accordingly, the present invention proposes interpolating or extrapolating using a polar co-ordinate system whose origin lies at the projection of the acoustic centre of the seismic source onto the plane of the sensors, hereinafter called the source epicentre, for example by use of an expansion series defined in polar co-ordinates. The principle of the invention is illustrated in FIG. 2, which is a partial plan view of the survey of FIGS. 1A and 1B showing only two streamers and with the acoustic centre of the seismic source at the origin, O. For the sake of simplicity, we choose a two-dimensional coordinate system with an origin at the location of the source epicentre, depicted as lying on the x axis in FIG. 2. In practice, the streamer may be neither straight nor horizontal and the source may not lie on the x axis or be at the same depth as the streamer. However, these generalisations can all be accommodated from knowledge of the relative geometry of each sensor element with respect to the acoustic centre of the source.

For the specific survey of FIG. 1A having two sources that are actuated alternately, when interpolating or extrapolating data acquired consequent to actuation of one of these sources the origin O should be coincident with the epicentre of that source. This means that the coordinate system used for interpolating or extrapolating data acquired consequent to actuation of the left hand source of the survey of FIG. 1A will have its origin coincident with the epicentre of the left source and so will have a different origin to the coordinate system used for interpolating or extrapolating data acquired consequent to actuation of the right hand source of the survey of FIG. 1A (which will have its origin coincident with the epicentre of the right source).

FIG. 2 assumes that it is desired to estimate the seismic data at target point T, which is between one streamer and another. In Cartesian coordinates, the data at target point T would be interpolated using the data acquired at a receiver at point a (on one streamer of FIG. 2) and the data acquired at a receiver at point b (on the other streamer of FIG. 2). Points a and b are each near the front end of their respective streamers, and so have a small inline offset from the source epicentre (150 m in the specific example of FIG. 2). (As is known, the "offset" of a location is the horizontal distance between the location and the source; the "inline offset" is the component of the offset along the inline direction (defined below)). As stated above, the inventor has realised that the rate of change of the wavefield in the cross-line direction between two points with small offsets, such as points a and b, is too great to be successfully interpolated even with the use of cross-line gradients.

In two-dimensional Cartesian co-ordinates a point in a plane is defined by co-ordinates x and y which define the distance from the origin to the point along the x-axis and the y-axis respectively. In FIG. 2 the streamers are defined as extending along the x-axis so that, for the streamer arrangement of FIG. 2, the x-axis direction may also be known as the "inline direction" and the y-axis direction may also be known as the "crossline direction".

In two-dimensional polar co-ordinates a point lying in the x-y plane is defined by a radius p, which is the distance from the acoustic epicentre of the seismic source, taken as the origin, to the point, and by an angle $\phi$ which is the angle between the x-axis and the straight line joining the origin to the point. The relationship between the Cartesian co-ordinates (x,y) of a point and the polar co-ordinates $(\rho,\phi)$ of the point are given by:

$$x = \rho \cos \phi \qquad (3)$$

$$y = \rho \sin \phi \qquad (4)$$

$$\rho = (x^2 + y^2)^{1/2} \qquad (5)$$

$$\phi = \arctan(y/x) \qquad (6)$$

One suitable expansion for use in the present invention is a modified Taylor expansion of the general type proposed in GB 2 414 299 that includes up to, at most, first order terms. This is given by, in polar coordinates:

$$P(\rho + \Delta\rho, \phi + \Delta\phi) = P(\rho, \phi) + \frac{\Delta\rho}{2}\frac{\partial P}{\partial \rho} + \frac{\rho\Delta\phi}{2}\frac{\partial P}{\partial \phi} + O(\Delta^2) \qquad (7)$$

(It should be noted that equation (7) does not include as many terms as are shown in equation (2), as it contains only first order terms in $\Delta$ whereas equation (2) contains second order terms in $\Delta$.)

In the arrangement of FIG. 2, the derivative of the pressure along the streamer direction (ie $\partial P/\partial x$, as the streamer extends along the x-direction) may be estimated from pressure measurements taken at different receivers arranged along the streamer. Receivers are typically provided every few metres along a streamer (FIG. 2 shows a separation of 6.25 m between receivers, although other spacings such as 3.125 m may also be used), so that the derivative $\partial P/\partial x$ may be estimated with reasonable accuracy over the typical seismic bandwidth. Similarly, the derivative of the pressure perpendicular to the streamer direction (ie, $\partial P/\partial y$ when the y-axis is defined as that perpendicular to the streamer direction) may be estimated from the pressure measurements taken at receivers that are disposed on different streamers and that have the same x-coordinate. However, this estimate is likely to be less accurate owing to the greater distance between receivers in the cross-line direction than the in-line direction and so a preferred application of this invention is to data acquired using multi-component streamers in which the cross-line gradient is directly estimated from a geophone or accelerometer, using equations (1). To assist in estimating $P(\rho+\Delta\rho,\phi+\Delta\phi)$ it may therefore be desirable to replace the terms $$\frac{\partial P}{\partial \rho} \text{ and } \frac{\partial P}{\partial \phi}$$

in equation (7) by estimates of $\partial P/\partial x$ and $\partial P/\partial y$.

The partial derivatives of P in Equation (7) may be replaced with derivatives along the x- and y-directions using the known relative positions of source and receivers, according to:

$$\frac{\partial P}{\partial \rho} = \frac{\partial P}{\partial x}\cos\phi + \frac{\partial P}{\partial y}\sin\phi \qquad (8)$$

$$\frac{\partial P}{\partial \phi} = \frac{\partial P}{\partial y}\sin\phi - \frac{\partial P}{\partial x}\cos\phi \qquad (9)$$

Substituting these into equation (7) gives:

$$P(\rho + \Delta\rho, \phi + \Delta\phi) = P(\rho, \phi) + \qquad (10)$$
$$\frac{\Delta\rho}{2}\left[\frac{\partial P}{\partial x}\cos\phi + \frac{\partial P}{\partial y}\sin\phi\right] + \frac{\rho\Delta\phi}{2}\left[\frac{\partial P}{\partial y}\cos\phi + \frac{\partial P}{\partial x}\sin\phi\right] + O(\Delta^2)$$

The estimates of $\partial P/\partial x$ and $\partial P/\partial y$ exist at sensor locations along the streamers in FIG. 2, as do estimates of $\partial P/\partial \rho$ and $\partial P/\partial \phi$ through knowledge of the source-receiver geometry. To interpolate onto the output location T in FIG. 2, it is necessary to determine the intersections, p and q, of the arc OT onto the two streamers, which will generally not be at sensor locations, and compute the values of pressure P and the gradients of pressure at the intersections, p and q. Values of pressure P and the gradients of pressure are interpolated onto locations p and q easily because of the fine inline sampling. These estimated values of $\partial P/\partial x$ and $\partial P/\partial y$, together with the known geometry of source and receivers, may be used to obtain an estimate for $P(\rho+\Delta\rho,\phi+\Delta\phi)$, using equation (10) and by interpolating along the azimuthal arc pq onto the target location T. This interpolation will differ from the Cartesian interpolation between a and b because different sensor locations are used for the interpolation. For short offsets from the source, in a layered earth, a more accurate interpolation will result from polar interpolation because the inline interpolations are accurate due to fine sampling and the cross-line interpolation, along the arc of constant radius, will have a small gradient if the arc approximates the wavefront.

It should be noted that the present invention is not limited to use with the modified Taylor expansion of equation (7), but may be applied generally by transforming any desired expansion series for $P(x+\Delta x, y+\Delta y)$ into polar coordinates to give an expansion series for $P(\rho+\Delta\rho,\phi+\Delta\phi)$. Any terms $$\frac{\partial P}{\partial \rho} \text{ and } \frac{\partial P}{\partial \phi}$$

in the expansion series after transforming into polar coordinates may be replaced using equations (8) and (9), to define $P(\rho+\Delta\rho,\phi+\Delta\phi)$ in terms of $\partial P/\partial x$ and $\partial P/\partial y$. (If it is desired to take terms in the expansion that include second order or higher-order derivatives, the second order or higher-order derivatives of P in polar co-ordinates may be replaced by higher-order derivatives of P with respect to x or y, using known relationships. The limitation lies in the availability of estimates of the higher order spatial derivatives of pressure, or their equivalents. For example, GB 2 414 299 teaches the estimation of second order derivatives.)

The method in accordance with an embodiment of the present invention is not however limited to estimating $\partial P/\partial x$ and $\partial P/\partial y$ from pressure values acquired at different receivers. As one alternative, in a multi-component seismic survey in which pressure data and particle velocity data are both recorded, it may also be possible to estimate the pressure derivatives in the x-direction and the y-direction according to equations (1). Values of $\partial P/\partial x$ and/or $\partial P/\partial y$ obtained from measured particle velocity data using equations (1) may used instead of, or in addition to, values of $\partial P/\partial x$ and/or $\partial P/\partial y$ estimated from pressure measurements acquired at different receivers.

As a further alternative, it may be possible to deploy receivers in groups such that pressure gradients may be measured directly. For example GB 2 410 551 proposes deploying hydrophones in groups of two or more, with the spacing between hydrophones in a group being much less than the spacing between neighbouring groups, to allow direct measurement of at least one component of the pressure gradient. In one embodiment, GB 2 410 551 proposes mounting three hydrophones in a plane perpendicular to the streamer axis, with a fourth hydrophone being mounted outside this plane. This provides a tetrahedral group of hydrophones that can measure pressure gradients in the in-line direction, cross-line direction and vertical direction.

It should be noted that, although equation (10) gives an expansion for use in interpolating or extrapolating the pressure and the above description relates to interpolating or extrapolating the pressure, the invention is not limited to interpolating or extrapolating the pressure. On the contrary, the methods of the invention may be applied to interpolating or extrapolating any desired seismic wavefield property including, without limitation, the particle velocity or a derivative thereof. While the expansion series mentioned above are for use in interpolating or extrapolating the pressure, analogous expansion series may be used for interpolating or extrapolating the particle velocity or a derivative thereof (or any other measured seismic wavefield property). Only the order of the expansion series may be limited by availability of estimates of the appropriate derivatives of the wavefield quantity being interpolated/extrapolated. However, it is expected that at short offsets, interpolation/extrapolation in polar coordinates will be more accurate, order for order, than the corresponding Cartesian interpolation/extrapolation.

Indeed, the present invention is, in principle, not limited to interpolating or extrapolating a seismic wavefield property, but may be applied to interpolating or extrapolating other variables associated with the wavefront.

Figure 3:
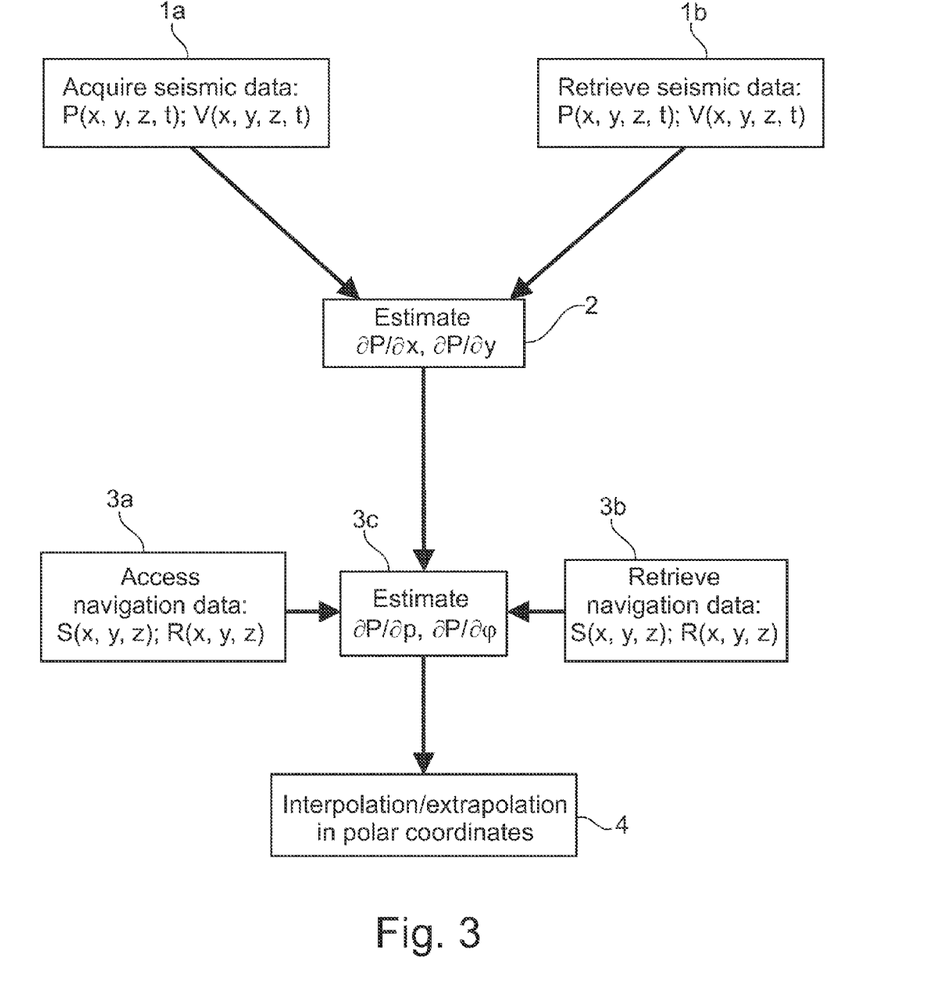
FIG. 3 is a block flow diagram illustrating a method according to an embodiment of the present invention.

FIG. 3 is a flow diagram illustrating a method according to an embodiment of the present invention. FIG. 3 describes an embodiment that relates to interpolating/extrapolating pressure measurements but, as noted above, the invention is not limited to interpolating/extrapolating pressure. The invention may be used to interpolate/extrapolate other measurements such as particle motion, for example particle velocity.

Initially in FIG. 3, seismic data, consisting of at least pressure data, are acquired at two or more different locations at step 1a. The data may, for example, be acquired using receivers disposed on two or more seismic cables. Alternatively the invention may be performed on pre-existing seismic data, in which case step 1a is replaced by step 1b of retrieving data from storage.

FIG. 3 illustrates an embodiment of the invention in which the seismic data acquired at step 1a or retrieved at step 1b are multi-component seismic data that include both pressure data and particle motion data, in the illustrated example particle velocity data. Applying the invention to multi-component seismic data has the advantage that the derivatives a $\partial P/\partial x$ and a $\partial P/\partial y$ may be estimated from the time-derivatives of the velocity according to equations (1) above. This may be advantageous in allowing for improved estimation of the cross-line derivative $\partial P/\partial y$ although it less important for the in-line derivative a $\partial P/\partial x$ which can easily be estimated from neighbouring hydrophones provided along a single streamer.

At step 2, estimates of the gradient of the pressure with respect to the x- and y-coordinates ($\partial P/\partial x$, $\partial P/\partial y$) are obtained. These gradients may be estimated in any suitable way including, but not limited to, estimating $\partial P/\partial x$ from pressure values obtained at receivers disposed along a streamer and thus having the same value of y-coordinate but different values of x-coordinate (and/or estimating a $\partial P/\partial y$ from pressure values obtained at receivers with the same value of the x-coordinate but different values of y-coordinate), estimating, in an embodiment in which multi-component (pressure and particle motion) data are acquired or retrieved, a $\partial P/\partial x$ and/or a $\partial P/\partial y$ from measured components of the particle velocity according to equations (1), or measuring the pressure gradients directly using groups of hydrophones according to the teaching of GB 2 410 551.

At step 3c, the pressure derivatives $$\frac{\partial P}{\partial \rho} \text{ and } \frac{\partial P}{\partial \phi}$$

are obtained from the pressure gradients with respect to the x- and y-coordinates $\partial P/\partial x$, $\partial P/\partial y$, for example according to equations (8) and (9). The determination of the pressure derivatives $$\frac{\partial P}{\partial \rho} \text{ and } \frac{\partial P}{\partial \phi}$$

requires knowledge of the positions of the receivers used to acquire the data relative to the position of the source. The method of FIG. 3 therefore includes step 3a of accessing "navigation data", that is position data S(x,y,z) for the source and position data R(x,y,z) for the receivers used to acquire the data. Alternatively, where the method is applied to pre-existing data step 3a, may be replaced by the step 3b of retrieving stored navigation data. The co-ordinates of the receivers relative to the epicentre of the source (which is deemed to be the origin) may be determined from the navigation data, and the pressure derivatives $$\frac{\partial P}{\partial \rho} \text{ and } \frac{\partial P}{\partial \phi}$$

may then be obtained from a ∂P/∂x, ∂P/∂y and the x- and y-coordinates of the receivers relative to the epicentre of the source.

It will be seen that the navigation data S(x,y,z) and R(x,y,z) are not indicated as being time dependent. In the case of a towed marine seismic survey, the positions of the receivers relative to the source remain substantially constant over the time taken to acquire one shot record (although the absolute positions of the receivers and source change as the receivers and source are towed through the water). Since fresh shot-receiver positions are computed for each shot point, updated relative geometries may be incorporated for each shot, by use of position data S(x,y,z) and position data R(x,y,z) relating for each shot. When high-density inline spatial sampling is available (for example 3.125 m recorded sensor spacing), it is possible, as taught in U.S. Pat. No. 6,898,148B2 and U.S. Pat. No. 6,480,440, to apply streamer motion correction to compensate for the movement of the sensors with respect to the propagating wavefields, thereby creating a virtual, stationary recording point.

At step 4, the seismic data are interpolated and/or extrapolated to estimate the pressure at one or more target locations at which no data were acquired. According to the invention, the interpolation and/or extrapolation is performed using a system of polar coordinates whose origin lies at the projection of the acoustic centre of the seismic source onto the plane of the sensors. Moreover, as noted above, the polar co-ordinate system may be chosen to approximate the seismic wavefront in an earth model, and for example may be chosen to approximate the seismic wavefront in an earth model in which properties vary only with depth.

As an example, step 4 may be performed using an expansion series defined in polar co-ordinates. As a particular example, step 4 may be performed using a Taylor expansion series defined in polar co-ordinates, such as the expansion of equation (7). It should however be noted that this invention is not limited to any particular expansion series for the interpolation and/or extrapolation. Expansion series for use in interpolation and/or extrapolation, in particular the most effective combination of extrapolant and weighting scheme, are the subject of continuing research and any such scheme can, in principle, be cast in either Cartesian or polar coordinate systems.

It should be noted that it may not be necessary explicitly to calculate the terms $$\frac{\partial P}{\partial \rho} \text{ and } \frac{\partial P}{\partial \phi}.$$

For example, the invention may be implemented using an equation such as equation (10) which contains terms in ∂P/∂x and ∂P/∂y rather than $$\frac{\partial P}{\partial \rho} \text{ and } \frac{\partial P}{\partial \phi}.$$

In such a case, the method of FIG. 3 can be modified by using the navigation data acquired at step 3a or retrieved at step 3b to determine the values of cos φ and sin φ required by equation (10).

Once pressure data have been estimated for one or more target locations, the estimated pressure data may undergo further processing steps (not shown in FIG. 3). For example, in processing time-lapse survey data the pressure data estimated for one or more target locations may be compared with data acquired at, or estimated for, the same target location(s) in an earlier survey, to obtain information about changes in the reservoir. Alternatively, the pressure data estimated for the one or more target locations may undergo further processing to obtain information about one or more parameters of the earth's interior.

Figure 4A:
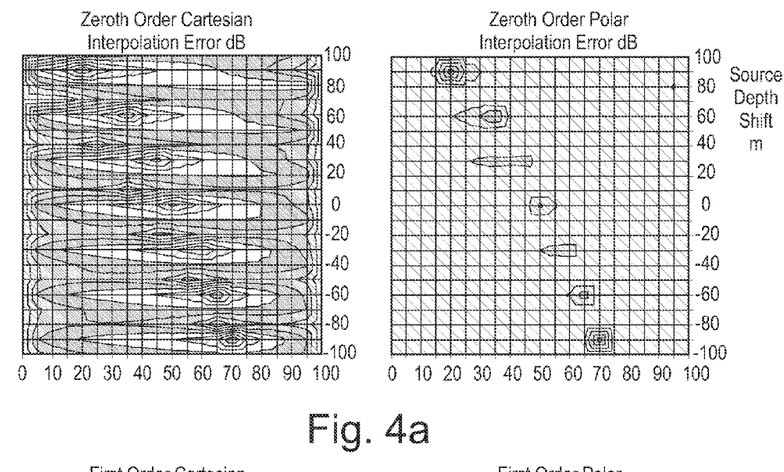
FIGS. 4(a) and 4(b) show results of an embodiment of the present invention.
Figure 4B:
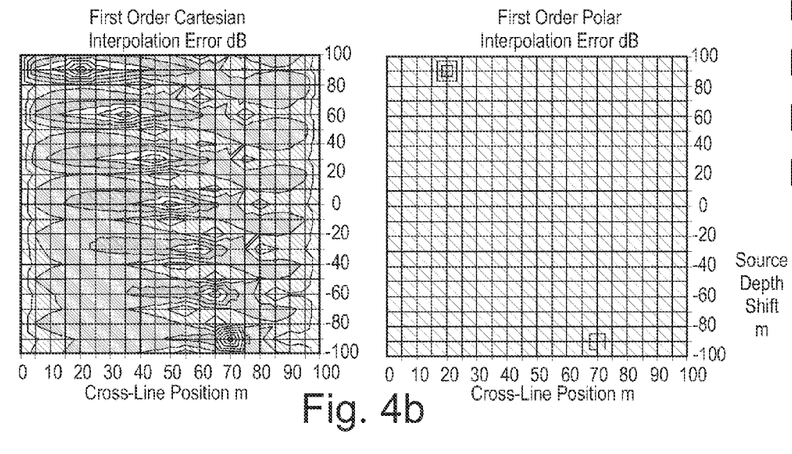

FIGS. 4(a) and 4(b) shows results obtained from embodiments of the present invention. These results are obtained by simulating the seismic pressure data acquired at receivers located as shown in FIG. 2, namely arranged along two streamers arranged parallel to one another with a cross-line separation of 100 m. Once the data have been simulated, the pressure is estimated for a target location X located along a cross-line between the two streamers, located 150 m from the source epicentre (which is positioned at the origin O), by interpolation using the values of the pressure field simulated for the two points a and b shown in FIG. 1. The value of the pressure estimated for the target location X by interpolation is then compared with the actual value of the pressure obtained for the target location X in the simulation.

The two views in FIG. 4(a) show the difference between the value of the pressure estimated for the target location X by interpolation and the actual value of the pressure obtained for the target location X in the simulation when zeroth order Cartesian interpolation is used (left hand view) and when zeroth order interpolation in polar coordinates is used (right hand view). Zeroth order interpolation is simple linear interpolation without the use of gradient data. The two views in FIG. 4(b) show the difference between the value of the pressure estimated for the target location X by interpolation and the actual value of the pressure obtained for the target location X in the simulation when first order Cartesian interpolation is used (left hand view) and when first order interpolation in polar coordinates is used (right hand view). FIGS. 4(a) and 4(b) show the results obtained for a simulation with a 50 Hz monochromatic source, for a ±100 m range of source depths centred on 1,000 m. They show results for cross-line positions of the target location from 0 m to 100 m, ie for the target location X being anywhere from coincident with one streamer to coincident with the other one streamer. The interpolation in polar co-ordinates was performed using equation (10).

It should be noted that zeroth order interpolation using polar coordinates leads to a different result from zeroth order interpolation using Cartesian interpolation because the sensors which contribute to the interpolated signal are different. The Cartesian approach takes account only of the location of the sensors, while the polar interpolation uses knowledge of the source location in defining where the lines of constant pressure should be for an earth model varying only with depth. As explained above, polar interpolation makes use of the expected structure of the wavefield to reduce the aliasing due to undersampling in the cross-line direction.

FIGS. 4(a) and 4(b) show the relative errors in dB. The lower the error, the closer the result of the interpolation is to the actual value obtained in the simulation. As can be seen from FIGS. 4(a) and 4(b), the results of interpolation using polar coordinates are much more accurate than the results of interpolation using Cartesian coordinates. The results for interpolation with polar coordinates, even for the zeroth order interpolation, show errors of less than 40 dB for almost all the range of cross-line position and source depth covered in FIGS. 4(a) and 4(b). The interpolation using Cartesian coordinates however can achieve errors of under 40 dB only for a few target locations (apart from target locations very close to one of the streamers where the results of interpolation would be expected to be reliable).

FIGS. 4(a) and 4(b) show that polar interpolation in a 1D medium with no gradient information (zeroth order) performs better than Cartesian interpolation in a 1D medium with gradients (first order). The largest relative errors occur every 30 m in depth, corresponding to nulls in the wavefield at intervals of the wavelength. The first-order polar interpolation (using the first order gradient) gives an improved result over zeroth-order polar interpolation because, although the azimuthal gradient is zero along the line of constant phase, the radial gradient provides a more accurate estimate of the field between two consecutive sensors on each streamer (see FIG. 2).

The results of FIGS. 4(a) and 4(b) were obtained using modified Taylor extrapolants with linear weighting according to the teaching of GB 2414299 in both polar and Cartesian coordinates. However, the use of this particular interpolation/extrapolation scheme was purely to illustrate the impact of the coordinate system used upon the results, not to propose the use of these particular extrapolants or weights. As previously stated, the present invention is not limited to one particular interpolation/extrapolation scheme.

It is expected that performing the interpolation using polar coordinates will generally perform better overall than interpolation using Cartesian coordinates, but that the improvement given by performing the interpolation using polar coordinates will diminish with increasing offset from the source owing to the cross-line Cartesian gradients and the azimuthal polar gradients converging with one another with increasing offset.

Figure 5A:
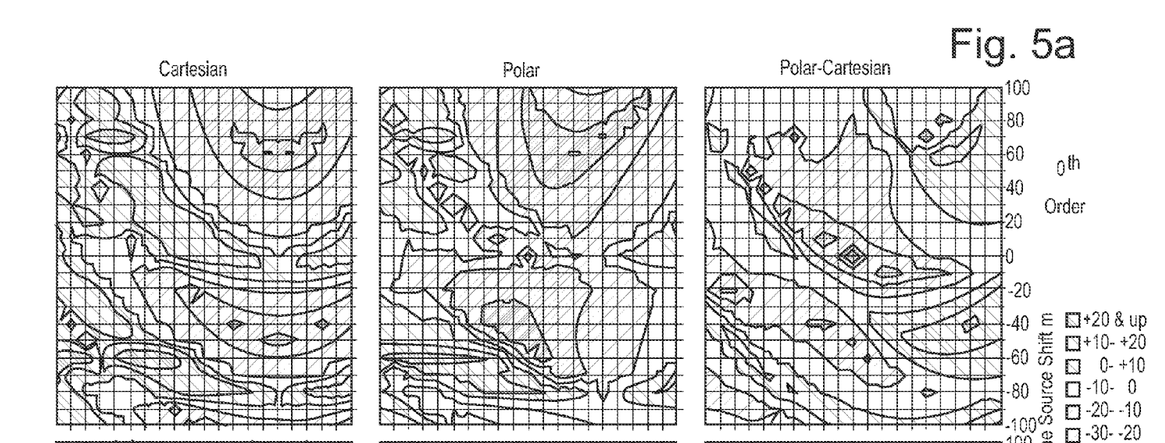
FIGS. 5(a) and 5(b) show results of an embodiment of the present invention.
Figure 5B:
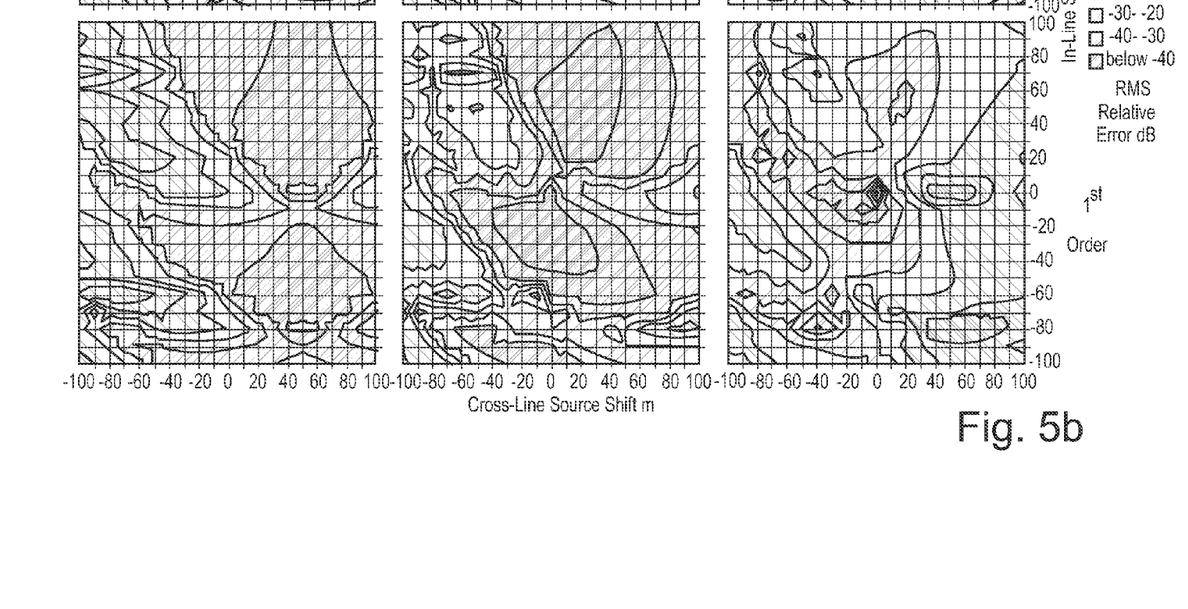

FIGS. 5(a) and 5(b) depict further results of embodiments of the present invention. These illustrate the sensitivities of zeroth and first-order polar and Cartesian cross-line interpolations to reflector dips in both the in-line and cross-line directions (a reflector that is not horizontal is said to be a "dipped" reflector). Such dips cause the epicentre of the image of the source (after reflection) to deviate from the actual source epicentre, which is the origin for polar interpolation. FIGS. 5(a) and 5(b) show a comparison of the root-mean-squared relative error (that is, the error between the simulated value and the value obtained by interpolation) averaged along the 100 m cross-line from point a to point b at 150 m from the source, for ±100 m in-line and cross-line shifts of the image source relative to the origin, O, corresponding to dips of a reflector at 500 m depth ranging from −6° to +6° in both in-line and cross-line directions.

FIG. 5(a) shows the results of zeroth order interpolation using Cartesian coordinates (left view), the results of zeroth order interpolation using polar coordinates (centre view) and the ratio of the errors in zeroth order interpolation using polar coordinates to the errors in zeroth order interpolation using Cartesian coordinates (right view). FIG. 5(b) shows results for first order interpolation using Cartesian coordinates (left view), first order interpolation using polar coordinates (centre view) and the ratio of the errors in first order interpolation using polar coordinates to the errors in first order interpolation using Cartesian coordinates (right view).

The left and centre views of FIGS. 5(a) and 5(b) show that, as expected, the interpolation is sensitive to reflector dip, particularly to dip in the cross-line direction with the error increasing as the magnitude of the crossline source shift increases from zero. However, the interpolation using polar co-ordinates generally produces lower error than the interpolation using Cartesian co-ordinates.

The distributions of relative errors differ between the results for interpolation using polar co-ordinates and interpolation using Cartesian co-ordinates, and the polar-Cartesian dB difference is therefore shown in the right view in FIGS. 5(a) and 5(b). This represents the ratio of absolute errors for interpolation using polar co-ordinates to absolute errors for interpolation using Cartesian co-ordinates. The errors are equal at the white-grey contour, so that all regions of the right views which are white or light grey represent regions where the polar interpolation performs better than the Cartesian interpolation. It can be seen that polar interpolation performs better than the Cartesian interpolation over much more than half the plot areas.

It should be noted that the assumption of wavefield symmetry, which is responsible for the improved performance of interpolation using polar coordinates relies, is dependent upon the output of the source being isotropic with azimuth. For some sources this is not the case, and the extent to which azimuthal dependence of the output of the source may affect the results of interpolation using polar coordinates has not yet been investigated in depth. If azimuthal dependence of the output of the source should cause a problem, it would be possible to use an azimuthally-invariant source, for example as taught in GB 2376528. Alternatively, it may also be possible to use known azimuthal variation of the output of the source (for example as predicted by the Notional Source Method of U.S. Pat. No. 4,476,553) to constrain the interpolation. Knowledge of the far-field signature may also provide constraints for wavefield extrapolation to zero, or even negative, offsets for multiple attenuation (where, as an example, a location that, in the arrangement of FIG. 2, has a negative x-co-ordinate has a negative inline offset).

Embodiments of the present invention been described above with reference to a 2-dimensional polar coordinate system, and this is appropriate where the z-component (vertical component) can be ignored, where the receivers used to acquire the seismic data have the same (or substantially the same) z-coordinate as one another and where the target location has the same (or substantially the same) z-coordinate as the receivers. The invention is not limited to interpolation or extrapolation in two dimensions, however, and may in principle be applied with a 3-dimensional polar coordinate system such as a cylindrical coordinate system in which a point is defined by coordinates $\rho, \phi, z$ where $\rho$ and $\phi$ are as defined in FIG. 2 and z is the coordinate in the vertical direction—provided that there is knowledge of the vertical gradient then it is possible to carry out the interpolation described above while allowing for differences in height between receivers on different streamers or for differences in height between receivers and the target location.

The invention has been described with particular reference to interpolating/extrapolating seismic data acquired using a towed streamer array. However the invention is not limited to this, and may be applied independently of the method used to acquire the seismic data.

Figure 6:
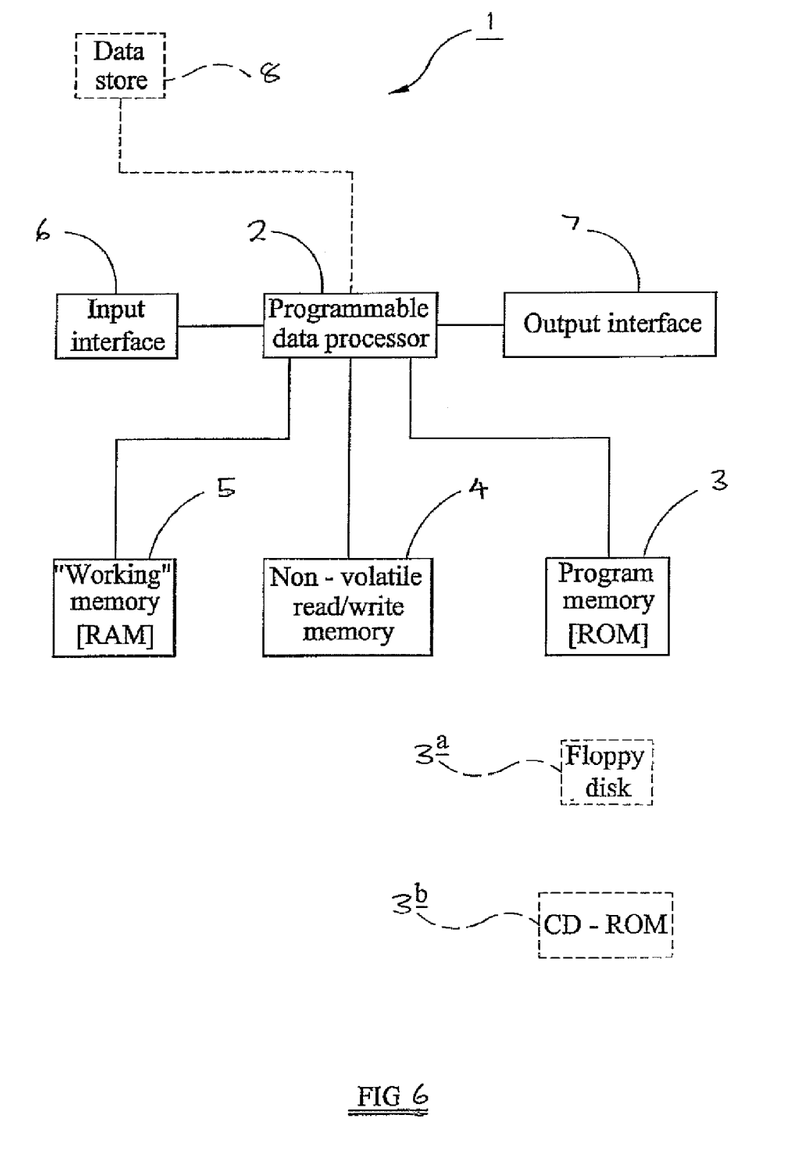
FIG. 6 is a block schematic diagram of an apparatus in accordance with embodiment of the present invention.

FIG. 6 is a schematic block diagram of a programmable apparatus 1 according to an embodiment of the present invention. The apparatus comprises a programmable data processor 2 with a program memory 3, for instance in the form of a read-only memory (ROM), storing a program for controlling the data processor 2 to perform any of the processing methods described above. The apparatus further comprises non-volatile read/write memory 4 for storing, for example, any data which must be retained in the absence of power supply. A "working" or scratch pad memory for the data processor is provided by a random access memory (RAM) 5. An input interface 6 is provided, for instance for receiving commands and data. An output interface 7 is provided, for instance for displaying information relating to the progress and result of the method. Seismic data for processing may be supplied via the input interface 6, or may alternatively be retrieved from a machine-readable data store 8. The apparatus may process the data by carrying out interpolation/extrapolation as described above to obtain the value of at least one seismic parameter at one or more target locations. Once the value of the seismic parameter(s) have been determined for the target location(s), the apparatus may carry out further processing on the seismic parameter(s), for example to obtain information about one or more parameters of the earth's interior The program for operating the system and for performing a method as described hereinbefore is stored in the program memory 3, which may be embodied as a semi-conductor memory, for instance of the well-known ROM type. However, the program may be stored in any other suitable storage medium, such as magnetic data carrier 3a, such as a "floppy disk" or CD-ROM 3b.

The invention claimed is:

1. A method of processing seismic data acquired at a plurality of locations, the method comprising:
    interpolating and/or extrapolating the seismic data-to estimate seismic data at a target location different from the plurality of locations, wherein the interpolating and/or extrapolating of the seismic data is performed in a polar co-ordinate system, and wherein a coordinate origin of the polar co-ordinate system is configured to be substantially coincident with a location of a seismic source used in the acquisition of the seismic data; and
    processing the estimated seismic data for the target location to obtain information about one or more parameters of the earth's interior.

2. A method as claimed in claim 1 wherein the interpolating and/or extrapolating the seismic data is performed in a 2-D polar coordinate system.

3. A method as claimed in claim 1 wherein the interpolating and/or extrapolating the seismic data is performed in a polar co-ordinate system that approximates the seismic wavefront in an earth model.

4. A method as claimed in claim 3 wherein the interpolating and/or extrapolating the seismic data is performed in a polar co-ordinate system that approximates the seismic wavefront in an earth model in which properties vary only with depth.

5. A method as claimed in claim 1, wherein the interpolating and/or extrapolating the seismic data is performed using an expansion series defined in a polar coordinate system.

6. A method as claimed in claim 5 wherein the expansion series is a Taylor expansion series.

7. A method as claimed in claim 1, further comprising interpolating and/or extrapolating pressure data from the acquired seismic data, wherein the interpolating and/or extrapolating pressure data from the acquired seismic data is performed in the polar-coordinate system.

8. A method as claimed in claim 1, comprising: interpolating and/or extrapolating particle velocity data from the acquired seismic data, wherein the interpolating and/or extrapolating particle velocity data from the acquired seismic data is performed in the polar-coordinate system.

9. A method as claimed in claim 1 wherein the seismic data is acquired using receivers disposed in or on two or more seismic cables.

10. A method as claimed in claim 1 wherein the seismic data comprises multi-component seismic data.

11. A method as claimed in claim 9, further comprising: estimating a spatial derivative of a first component of the seismic data using a second component of the seismic data.

12. A method as claimed in claim 11, wherein the spatial derivative of the first component of the seismic data is a derivative along a direction substantially perpendicular to the seismic cables.

13. A method as claimed in claim 1 wherein an origin of the polar co-ordinate system is substantially coincident with a horizontal position of an acoustic centre of a source used to generate the seismic data.

14. A method as claimed in claim 1, comprising; disposing a plurality of seismic receivers in a survey area and
    acquiring the seismic data using the receivers.

15. A method as claimed in claim 14 and comprising acquiring the seismic data using receivers disposed in or on two or more seismic cables.

16. A method as claimed in claim 9, further comprising: interpolating the seismic data to estimate seismic data at a target location disposed between one seismic cable and another seismic cable.

17. A method as claimed in claim 9 further comprising: extrapolating the seismic data to estimate seismic data at a target location disposed between one seismic cable and a seismic source.

18. A computer-readable medium containing instructions that, when executed by a processor, perform a method of processing seismic data acquired at a plurality of locations, the method comprising interpolating and/or extrapolating the seismic data-in a polar co-ordinate system to estimate seismic data at a target location, wherein the target location is different from the plurality of locations and a coordinate origin of the polar co-ordinate system is configured to be consistent with an epicenter of a seismic source used to acquire the seismic data.

* * * * *